United States Patent [19]

Weiss

[11] Patent Number: 4,474,531
[45] Date of Patent: Oct. 2, 1984

[54] WINDMILL WITH DIRECTION-CONTROLLED FEATHERING

[75] Inventor: Herbert G. Weiss, Belmont, Mass.

[73] Assignee: U.S. Windpower, Inc., Burlington, Mass.

[21] Appl. No.: 453,763

[22] Filed: Dec. 27, 1982

[51] Int. Cl.³ ............................................. F03D 7/04
[52] U.S. Cl. ...................................... 416/11; 416/12; 416/17; 416/31
[58] Field of Search ....................... 416/17, 11, 32, 12, 416/31

[56] References Cited

U.S. PATENT DOCUMENTS

| | | | |
|---|---|---|---|
| 2,360,791 | 10/1944 | Putnam | 416/9 X |
| 4,084,921 | 4/1978 | Norz | 416/17 |
| 4,160,170 | 7/1979 | Harner et al. | 416/41 A X |
| 4,186,313 | 1/1980 | Wurtz | 290/44 |
| 4,201,514 | 5/1980 | Huetter | 416/11 X |
| 4,297,076 | 10/1981 | Donham et al. | 416/37 |
| 4,339,666 | 7/1982 | Patrick et al. | 416/43 A X |

FOREIGN PATENT DOCUMENTS

| | | | |
|---|---|---|---|
| 742239 | 11/1943 | Fed. Rep. of Germany | 416/13 |
| 2067247 | 7/1981 | United Kingdom | 416/10 |

Primary Examiner—Everette A. Powell, Jr.
Attorney, Agent, or Firm—Cesari and McKenna

[57] ABSTRACT

A windmill employs a separate wind vane pivotably mounted on the chassis of the windmill. An internal sensor detects the relative angle between the wind vane and the windmill and activates the pitch-control mechanism of the windmill to feather the windmill blades whenever the angle exceeds a predetermined maximum.

1 Claim, 2 Drawing Figures

WINDMILL WITH DIRECTION-CONTROLLED FEATHERING

BACKGROUND OF THE INVENTION

The present invention is directed to windmills and, in particular, to means for controlling turbine-blade pitch.

Cost and efficiency considerations dictate that windmill parts should be as light in weight as possible. On the other hand, the need to withstand wind stresses requires that the windmill parts be relatively massive. In order to reduce mass, therefore, windmills have been designed to minimize the stress experienced by the structure in response to expected wind force.

One way to reduce blade stress is to incline the blades slightly forward along the axis of rotation, i.e. in the wind direction. The centrifugal force experienced by the blades during turbine spin thus partly counteracts the wind force, which tends to bend the blades in the forward direction. This expedient, however, depends on a proper orientation of the windmill with respect to the wind direction. Specifically, this stress reduction provided by inclination of the blades depends on the degree to which the axis of rotation is aligned with the wind direction.

Although the windmill turbine is free to rotate to align itself with the wind, I have found that windmill turbines do not always respond quickly enough to sudden wind changes to maintain the desired alignment, and excessive blade stress can therefore result. Under such stress, blades may be damaged at their roots, or their tips may be bent back (downwind) and strike the tower.

It is an object of the present invention to reduce the likelihood that sudden wind shifts will enable the wind to apply a force to the blades in such a direction that the centrifugal force does not counteract the wind force.

SUMMARY OF THE INVENTION

The foregoing and related objects are achieved in a windmill mounted on a support structure so that it can pivot to face into the wind. A turbine is mounted on the chassis and includes a turbine shaft and turbine blades extending outward from the shaft. The turbine is mounted to rotate with respect to the chassis about the shaft axis, and the chassis and the turbine are together aerodynamically arranged so that the chassis normally pivots into an orientation in which the axis of the shaft is approximately parallel to the wind direction and a front end of the chassis faces into the wind. The blades can be pivoted about their longitudinal axes between active positions, in which the blades experience a relatively high wind force, and a feathered position, in which the wind force experienced by the blades is substantially at a minimum.

According to the present invention, the windmill further includes a wind vane mounted on the chassis to rotate with respect to it in a plane substantially parallel to the plane in which the chassis pivots. As a result, the wind vane indicates the angle of the wind with respect to the axis of the turbine shaft. A pitch-control mechanism monitors the angle between the directions of the wind vane and the turbine shaft and adjusts the turbine blades to their feathered positions when that angle exceeds a predetermined maximum.

Such an arrangement is particularly beneficial in a windmill whose blades are inclined rearward from a plane perpendicular to the axis of the shaft.

BRIEF DESCRIPTION OF THE DRAWINGS

These and further features and advantages of the present invention are described in connection with the accompanying drawings, in which.

DETAILED DESCRIPTION OF THE PREFERRED EMBODIMENT

Figure 1:
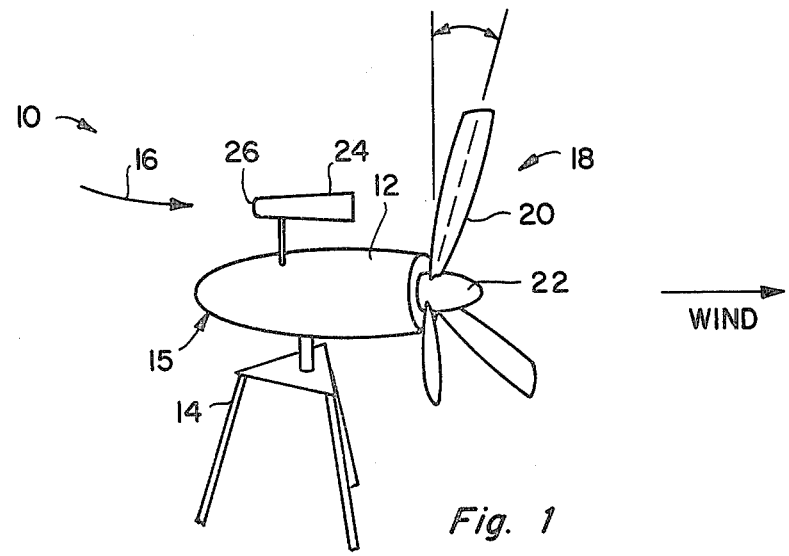
FIG. 1 is a simplified perspective view of a windmill embodying the present invention.

FIG. 1 depicts a windmill 10 mounted on a tower 11 that supports the windmill above the ground. A windmill chassis 12 is pivotably mounted at 14 to assume an orientation in which its front end, or bow, 15 is pointed into the wind. The wind direction is indicated by an arrow 16.

A wind turbine 18 includes a number of blades 20 that are mounted on a turbine shaft 22 rotatably mounted in the windmill chassis 12 to drive an internal generator not shown in the drawings. The blades 20 extend in an approximately radial direction from the shaft 22 but are inclined slightly rearward—i.e., in the ordinarily downwind direction—from the normal to the shaft 22. This inclination reduces stress on the blades; the wind applies a force to the blades to bend them in the downwind direction, and the centrifugal force of the resultant spinning includes an upwind component, when the blades are inclined downwind, that counteracts the downwind bending. This beneficial effect follows only if the wind is coming generally from the bow, though; wind whose velocity is in a direction opposite that indicated by the arrow 16 applies a force that is not counteracted by the centrifugal force and, in fact, is aided by it.

The windmill chassis 12 includes windmill equipment of the type illustrated, for example, in U.S. patent application Ser. No. 282,965, filed on July 13, 1981, by Chertok et al. for a Windpower System. Such equipment includes a generator powered by the spinning turbine. There might also be apparatus for receiving instructions from a remote location.

The interior equipment also includes a pitch controller for controlling the pitch of the blades 20. When the windmill is turned off, the pitch controller typically feathers the blades; i.e., it orients them about their longitudinal axes to such an angle that the wind causes no appreciable spinning and its force on the blades 20 is at a minimum.

In accordance with the present invention, a wind vane 24 is pivotably mounted at 26 on the windmill chassis 12 so as to point in the wind direction. Normally, therefore, the wind vane 24 is oriented parallel to the axis of the shaft 22. However, since the windmill must include a considerable amount of equipment and thus has a relatively high moment of inertia about its pivotal axis, it is not as responsive to changes in wind direction as is the wind vane 24, whose only function is to indicate wind direction. Consequently, during changes in wind direction, the orientation of the wind vane 24 is a better indicator of the direction of wind velocity than is the orientation of the chassis 12 of the windmill. It is thus the function of the wind vane 24 to indicate the angle between the wind and the direction in which the windmill is pointing.

When that angle is below a predetermined maximum, say 45°, the windmill operates in its conventional manner. When that maximum is exceeded, though, a sensor not shown in FIG. 1 causes the windmill's pitch-control mechanism to feather the turbine 18 and thus minimize the wind force experienced by the windmill.

Figure 2:
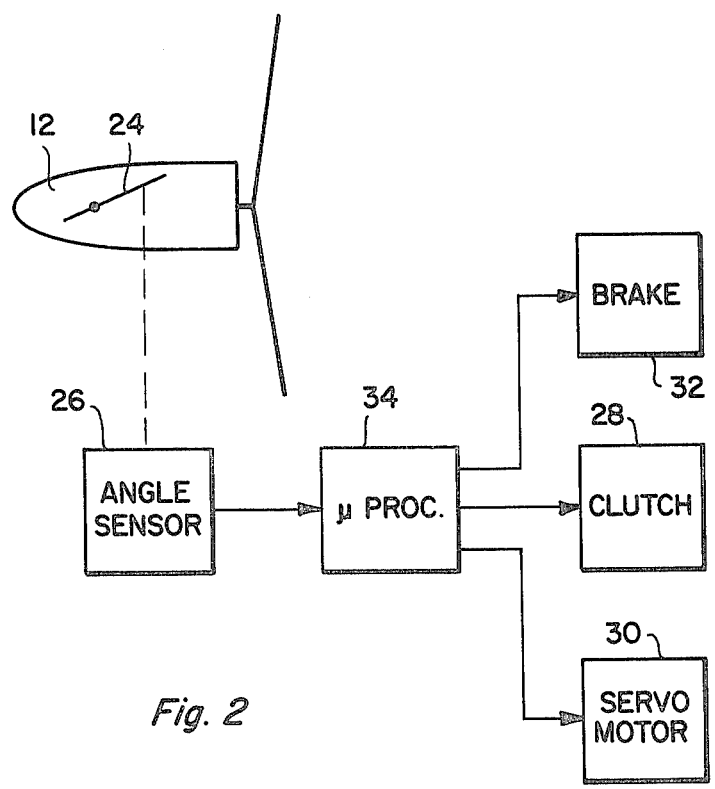
FIG. 2 is a block diagram of a control system employed in an exemplary embodiment of the present invention.

One of the ways to control blade pitch in response to the relative position of the wind vane 24 is depicted in FIG. 2, which is a block diagram of a system that is an adaptation of part of the pitch controller of the windmill described in the above-mentioned Chertok et al. application, which is hereby incorporated by reference.

An angle sensor 26 in FIG. 2 transmits signals containing information regarding the orientation of the wind vane 24 with respect to the windmill chassis 12. The angle sensor 24 may be any one of various sensors commonly used for similar purposes and can range from simple limit switches to synchros or other types of angle-sensing devices.

In the Chertok et al. windmill, blade pitch is controlled by an actuating rod that extends coaxially within the turbine shaft and rotates with it but is axially movable with respect to it. The pitch of the blades varies with the axial position of the actuating rod, and the actuating rod threadedly engages an actuating nut that can be rotated with respect to the turbine shaft. Therefore, the actuating rod moves axially with respect to the shaft if there is relative rotation between the shaft and the nut. The blade pitch then remains the same so long as the actuating nut spins at the same rate as the shaft does.

In order to maintain a given pitch, therefore, a clutch, represented in FIG. 2 by block 28, acts between the turbine shaft and the actuating nut so that they spin together while the clutch is activated. In order to feather the blades, the actuating nut must rotate in a direction opposite that of the shaft rotation so that the threaded engagement will cause the rod to advance axially and thus decrease the pitch. The Chertok et al. arrangement includes a servomotor for this purpose, represented in FIG. 2 by block 30, that can rotate the actuating nut at a rate higher than that of the turbine shaft in the same direction, or at some speed in the opposite direction. To feather the blades, the clutch 28 is released, and the motor drives the nut in a direction opposite to that of the shaft until the desired pitch is achieved. When the desired pitch is achieved, the clutch 28 is reengaged.

A pitch change to increase power can be achieved by releasing clutch 28 and driving the nut in the same direction as, but faster than, the turbine drive shaft.

The Chertok et al. arrangement also includes a brake, represented in FIG. 2 by block 32, that can be operated to stop the operating nut completely and thus rotate the blades to their fully feathered positions. Like the clutch, the brake is wired to fail safe: power is normally applied to it, keeping it in its released state, but if there is a power failure, the clutch 28 is released, and the brake 32 is applied to feather the blades.

The clutch 28, the servomotor 30, and the brake 32 are all controlled by a microprocessor 34 that typically monitors the rotational speed of the turbine shaft 22 and receives commands from remote locations. In response to speed information and these commands, it controls the pitch of the blades 20 in accordance with stored routines.

In order to carry out the teachings of the present invention, the microprocessor 34 can also be programmed to respond to signals from the angle sensor 26 and to operate appropriate combinations of the clutch 28, the servomotor 30, and the brake 32 to feather the turbine 18 when the angle between the windmill and the wind is greater than a predetermined maximum. The predetermined maximum can be a fixed value or, for example, a function of wind speed; specifically, it may be desired for greater angles to be tolerated when the wind speed is relatively low.

In the alternative, the angle sensor 26 can be employed merely to remove power from the control system and thus automatically disengage the clutch 28 and apply the brake 32. The sensor would thus take advantage of the failsafe arrangement of the pitch-control system.

In operation, the internal controls, not shown in the drawings, may receive a command from a remote location to begin operation. If the relative angle detected by sensor 26 is below the predetermined maximum, the result of this command is an adjustment of the blade pitch from the feather pitch position, which is the normal pitch when the windmill is not in operation, to a start-up pitch. If the angle between the wind and the windmill exceeds the maximum, on the other hand, the angle sensor 26 will prevent adjustment of the blade pitch to its start-up value. This result is only temporary, though, because the misalignment of the windmill with the wind will only be sustained if the wind velocity is too low to be useful. As the wind velocity increases, the chassis 12 of the windmill will align with the wind, the angle sensor 26 will permit the start-up pitch, and operation can begin.

As the wind velocity increases, the force on the turbine blades 20 increases, but the speed of rotation also increases, thus increasing the countervailing centrifugal force tending to prevent downwind bending.

It is possible, however, for the wind to shift too quickly for the windmill to slew around fast enough in response. In this situation, the wind can come from behind the windmill, tending to bend the windmill blades 20 toward the bow and thus cause the centrifugal force to add to, rather than subtract from, the bending force of the wind. Since the design of the blades 20 is based on the assumption that the centrifugal force will counteract the bending force of the wind, the force on the blades can be excessive if they are not feathered immediately. Since the wind vane 24 immediately senses the change in wind direction relative to the windmill housing, the angle sensor 26 causes the microprocessor 34 to release the clutch 28 and apply the brake 32, and the turbine blades 20 are thus feathered. Alternatively, the servomotor 30 can be used to feather the blades. The result is that the force experienced by the blades as a result of the wind is greatly diminished, and excessive strains are avoided.

Eventually, the chassis 12 of the windmill will realign itself with the wind, and the angle sensor 26 will sense this realignment and send a signal to the microprocessor 34 indicating the realignment. The microprocessor will then operate servo motor 30 to adjust the blades to the desired pitch, which will then be maintained by the clutch 28.

It is apparent that the present invention decreases the likelihood of excessive stress caused by misalignment between the wind and the windmill and thus allows the windmill designer to use lighter blades and thus a lighter turbine hub.

What is claimed as new and desired to be secured by Letters Patent is:

1. A windmill comprising:
   a. a tower;
   b. a chassis mounted on said tower for pivoting with respect thereto in response to wind direction;
   c. a turbine, including a turbine shaft and blades extending outward from said shaft, mounted on said chassis for rotation with respect to said chassis about the axis of said shaft, said chassis and turbine being aerodynamically arranged for said chassis normally to pivot into an orientation in which the axis of said shaft is approximately parallel to the wind direction and a front end of said chassis faces into the wind, said blades being attached to said shaft for rotation about longitudinal axes thereof between active positions, in which said blades experience a relatively high force from wind whose direction is parallel to said turbine shaft, and a feather position, in which the wind force experienced by said blades is substantially at a minimum when the axis of said shaft is approximately parallel to the wind direction, both when the front end of said chassis faces into the wind and when it faces away from the wind, said blades being inclined rearward from a plane perpedicular to the axis of said shaft so that centrifugal force tends to counteract the bending force applied by the wind when the front end of said chassis faces into the wind but not when it faces away from the wind;
   d. a wind vane mounted on said chassis for rotation with respect to said chassis in a plane substantially parallel to the plane in which said chassis pivots, said wind vane indicating the angle of the wind with respect to the axis of said turbine shaft; and
   e. a pitch-control mechanism for monitoring the angle between the directions of said wind vane and said turbine shaft and for adjusting said turbine blades to their feathered positions when that angle exceeds a predetermined maximum so that said blades present minimum wind resistance when the front of said chassis faces away from the wind.

* * * * *